United States Patent [19]
Piere

[11] 3,978,607
[45] Sept. 7, 1976

[54] SNAIL SNARE
[76] Inventor: Felix V. Piere, 3602 Summer Shore Lane, Westlake Village, Calif. 91361
[22] Filed: May 22, 1975
[21] Appl. No.: 579,833

[52] U.S. Cl. .................................. 43/131; 294/91
[51] Int. Cl.² ......................................... A01M 25/00
[58] Field of Search ....................... 43/131; 294/91

[56] References Cited
UNITED STATES PATENTS

| | | | |
|---|---|---|---|
| 1,287,956 | 12/1918 | Gendron | 294/91 |
| 1,298,662 | 4/1919 | Chadwick | 294/91 X |
| 1,960,464 | 5/1934 | Thalheimer | 43/131 |
| 2,977,711 | 4/1961 | Starr | 43/131 |
| 3,303,600 | 2/1967 | Freeman | 43/131 |

*Primary Examiner*—Louis G. Mancene
*Assistant Examiner*—Daniel J. Leach
*Attorney, Agent, or Firm*—Jack C. Munro

[57] ABSTRACT

A snail snare comprising a disc located beneath a cover member, the cover member including an outer annular wall having a plurality of openings therein permitting snails to move beneath the cover and gain access to pelletized poison located on the disc, a spike passing through both the cover and the disc and penetrating the ground and tightly holding the cover upon the ground, a portion of the cover being deflectable to permit access of a bracket to the attaching means in order to effect removal of such when it is desired to move the snail snare from one locale to another.

6 Claims, 4 Drawing Figures

U.S. Patent  Sept. 7, 1976  3,978,607
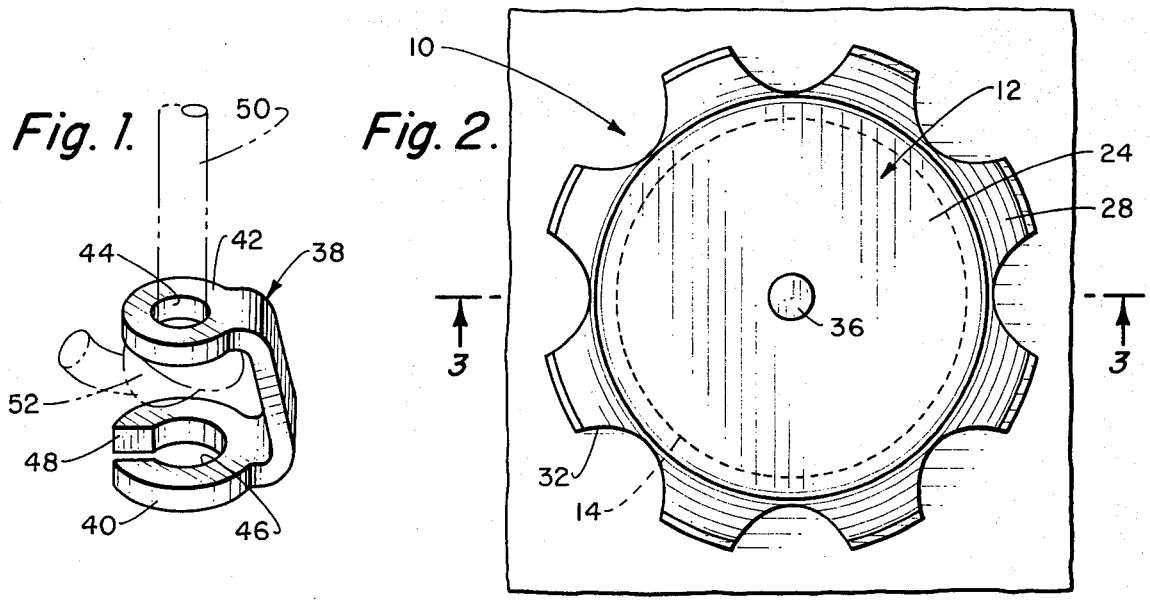
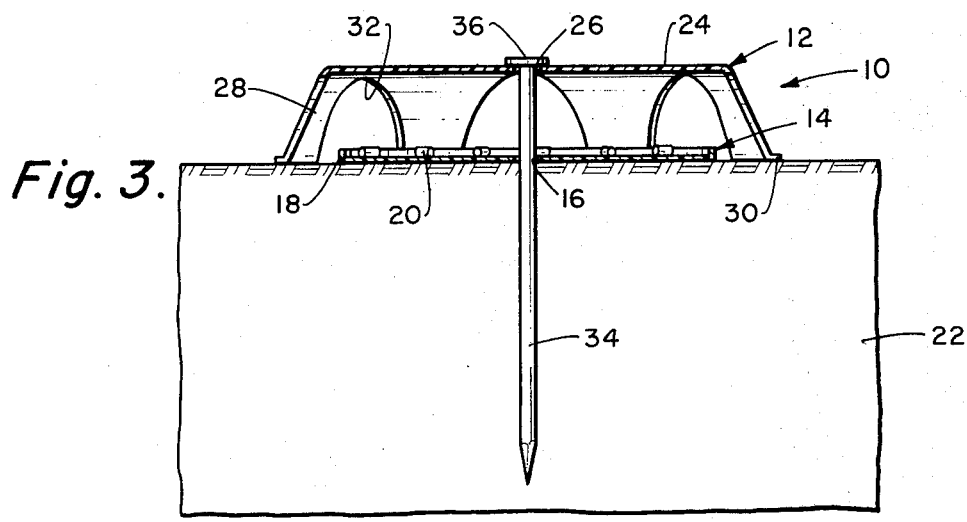
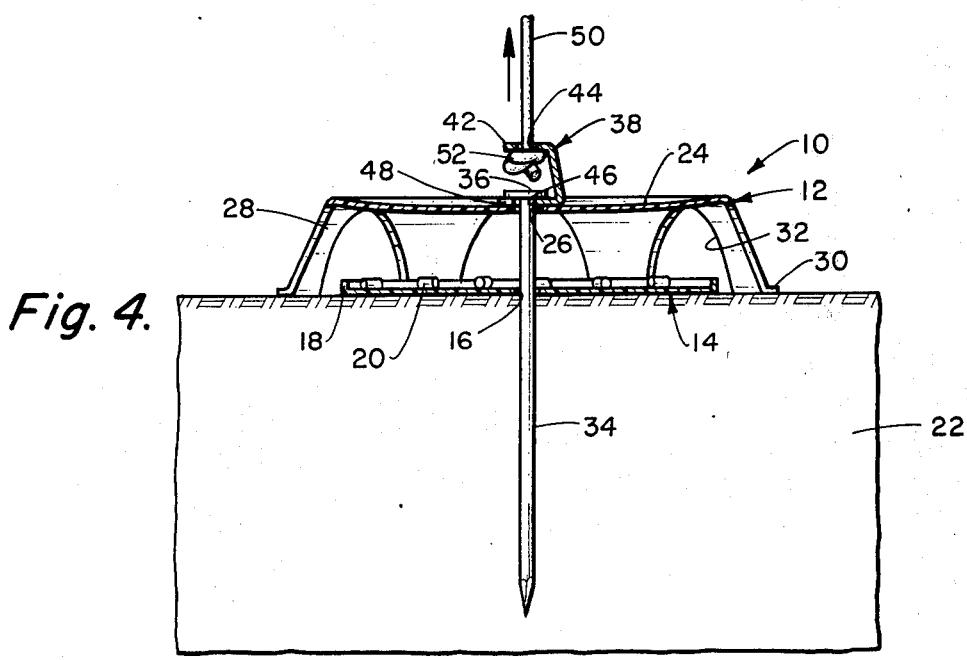

SNAIL SNARE

BACKGROUND OF THE INVENTION

Within some geographical areas there is a problem of overabundance of snails. Besides the snails feeding on plants and other ground covers, snails frequently cling to sides of buildings, sidewalks and many other types of rigid structures. The location of the snails is unsightly besides the damage that is done to plants.

At the present time, a pelletized poison is provided which can be spread across the ground which includes an attractant. The snails will feed upon the poison and subsequently die.

Spreading of the poison across the planted area, also makes the poison accessible to larger animals, both wild life animals and domesticated animals. It would be desirable to design the use of some type of snare which would make the poison accessible to the snails, but at the same time make the poison inaccessible to larger animals.

SUMMARY OF THE INVENTION

The subject matter of this invention is believed to be summarily described in the abstract of the disclosure and reference is to be had thereto.

The advantage of this invention relates to a device that provides readily accessibility of the poison to snails but makes the poison relatively not accessible to children, domesticated pets and wild animals when one uses a toxic means to kill snails and slugs in the form of a pelletized poison, a powder poison or a poison in liquid form. Although the subject matter of this invention is designed in particular to be used with a pelletized poison for the killing of snails, the subject invention could be used for poisons in other forms and also could be used against pests which are of a size similar to or smaller than the snail.

The device of this invention provides against contamination of soil and plants with tne poison material since the poison material does not come into direct contact with the soil. Another advantage of the device of this invention is that it does not permit the poison to contaminate any adjoining plants or vegetables in the locale in which it is being used. A further advantage of the device of this invention is that the toxicated snails remain in the direct area of the device and can be easily gathered and disposed of. A further advantage of this invention is that the snail snare can be constructed in a decorative manner which would make the device attractive in appearance when used within flower beds and the like.

BRIEF DESCRIPTION OF THE DRAWING

FIG. 1 is an isometric view of the means to assist in the removal of the snail snare of this invention when it is desired to move such from one locale to another;

FIG. 2 is a plan view of the snail snare of this invention;

FIG. 3 is a cross-sectional view taken along line 3—3 of FIG. 2; and

FIG. 4 is a view similar to FIG. 3 showing the means of FIG. 1 in position to remove the attaching means from the ground in order to permit the snail snare to be moved from one locale to another.

DETAILED DESCRIPTION OF THE SHOWN EMBODIMENT

Referring in particular to the drawing, there is shown the snail snare 10 of this invention which is generally composed of a cover 12 and a disc 14. The disc 14 has a central aperture 16. The disc 14 is constructed of a rigid material, such as a plastic material and along its peripheral edge includes an upstanding annular flange 18. A quantity of pelletized poison 20 is adapted to be placed upon the disc 14 and confined thereon by the annular flange 18. The disc 14 is adapted to be placed in direct contact with the ground 22, as shown in FIGS. 3 and 4.

The cover 12 includes a base 24 which has a central opening 26. The cover 12 is adapted to be constructed of a substantially rigid material, such as a plastic.

Connected to the periphery of the base 24 is an annular wall 28. The free edge of the annular wall 28 is formed into a flattened flange 30.

Formed within the annular wall 28 are a plurality of evenly spaced apart openings 32. Within the embodiment shown in the drawing, the openings 32 are eight in number. However, it is to be understood that any number of such openings could be employed. The size of the openings 32 are such that they will permit ready access of a snail therethrough but will prevent access of any larger animal to within the area confined by the cover 12.

In actual practice, the size of the disc is somewhat smaller than the diameter of the wall 28. This is preselected so as to prevent the fingers of children or the tongues of animals from penetrating any one of the openings 32 in order to gain access to the poison 20.

An attaching means in the form of an elongated spike 34 extends through the aperture 26 and the opening 16 and penetrates the ground 22. The spike 34 includes an enlarged head 36 and the head 36 is adapted to be in snug contact with the base 24, tightly holding the flange 30 in contact with the ground 22. The spike 34 prevents any animal from overturning the cover 12 and gaining access to the pelletized poison 20.

When it is desired to move the snare 10 from one locale to another locale or to stow the snare of this invention, the spike 34 is removed and the snare repositioned and the spike 34 replaced.

In order to facilitate removal of the spike 34, a bracket 38 is employed. The bracket 38 is substantially U-shaped having a lower leg 40 and an upper leg 42. Within the upper leg 42 is located an opening 44. Within the lower leg 40 is located an opening 46 with a cutout 48 providing access into said opening 46. A lanyard in the form of a rope 50 is passes through the opening 44 and is then formed into a knot 52.

In order to remove the spike 34, a person causes the base 24 of the cover 12 to deflect as shown in FIG. 4 of the drawing. The person then places the bracket 38 so that the body portion of the spike 34 passes through cutout 48 and is located within the confines of opening 46. The person then releases the force applied against the base 24 permitting the enlarged head 36 to come into physical contact with the portion of the lower leg 40 surrounding the opening 46. The person then applies a jerking removable force through the rope 50 to the bracket 38 causing the spike 34 to be removed from its penetrated state with the ground 22. With the spike 34 removed, the cover 12 and the disc 14 can be moved to another locale. Also, the spike 34 will be removed in order to gain access to the toxicated (or dead) snails located beneath the cover 12.

What is claimed is:

1. A snail snare adapted to be placed upon ground comprising:
   a disc having a central aperture, said disc adapted to be placed in direct contact with the ground, said disc adapted to have placed thereon a quantity of pelletized poison material;
   a cover having a base and an annular wall connected to the periphery of said base, said cover having a central opening, said cover to be positioned over said disc with said base spaced above said disc with said wall in direct contact with the ground, said wall having opening means therein to permit snails to move under said base and have access to the pelletized poison located on said disc;
   attaching means extending through said aperture of said disc and said opening of said cover penetrating the ground, said attaching means including an enlarged head in tight contact with said cover to snugly hold said cover upon the ground;
   means for removing said attaching means when it is desired to move said snare from one locale to another, said means including a member to grasp said attaching means to facilitate the application of a removal force, said base of said cover being deflectable to permit the insertion of said means between said enlarged head of said attaching means and said base.

2. The snail snare as defined in claim 1 wherein:
said opening means comprising a plurality of spaced apart openings evenly spaced about said annular wall.

3. The snail snare as defined in claim 2 wherein:
each of said openings being substantially U-shaped in configuration.

4. The snail snare as defined in claim 1 wherein:
said disc having a peripherally located upwardly extending flange in order to confine the pelletized poison.

5. The snail snare as defined in claim 1 wherein:
said attaching means comprising an elongated spike.

6. The snail snare as defined in claim 1 wherein:
said means including a rigid bracket, a rope connected to said rigid bracket, said rope adapted to be grasped with said rigid bracket in direct contact with said attaching means and supplying a manual removing force thereto.

* * * * *